No. 785,511. PATENTED MAR. 21, 1905.
W. D. MILLER.
WIRE STRETCHING DEVICE.
APPLICATION FILED DEC. 20, 1904.
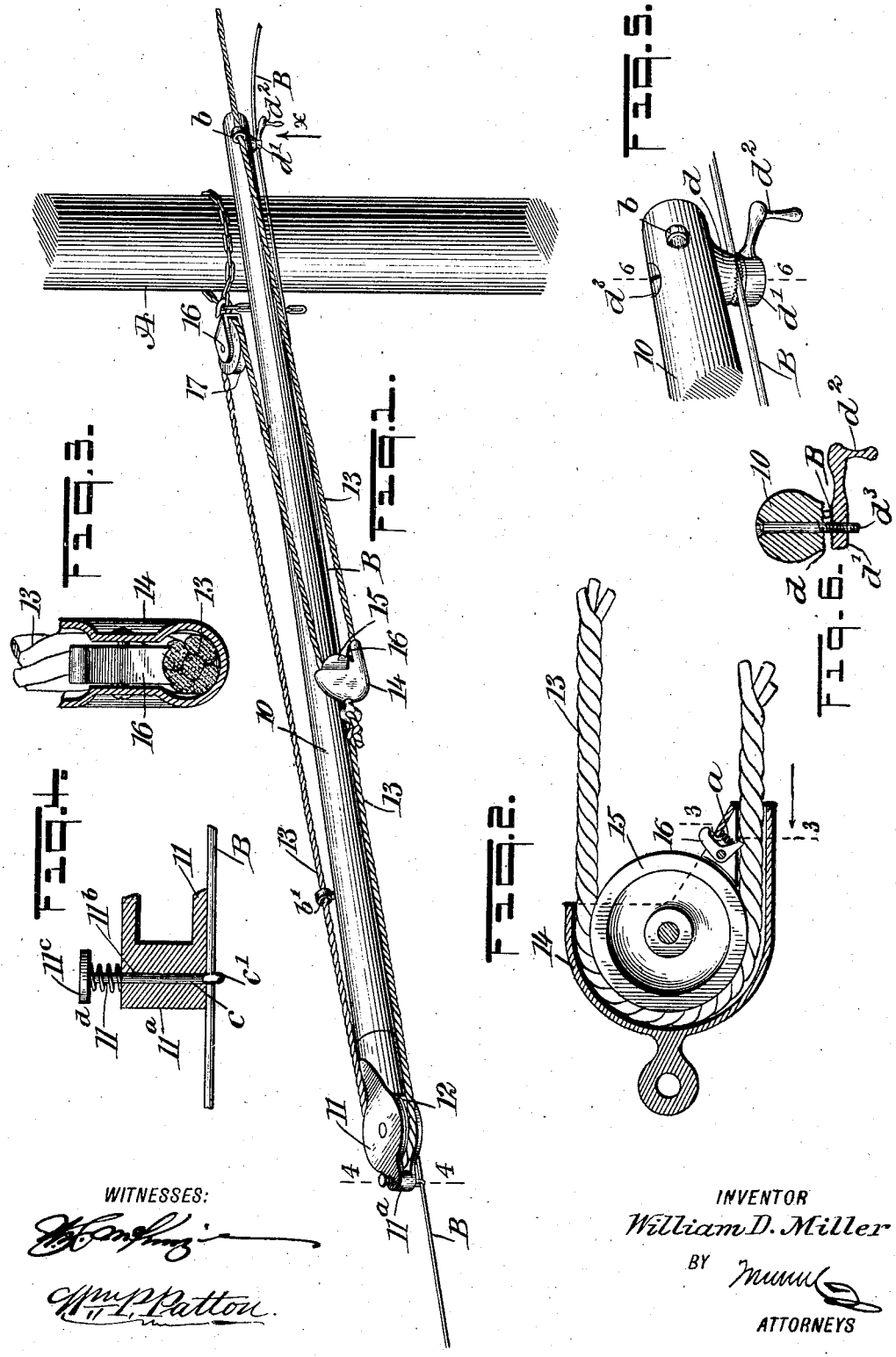

No. 785,511.                                      Patented March 21, 1905.

UNITED STATES PATENT OFFICE.

WILLIAM DEWITT MILLER, OF SACO, MONTANA.

WIRE-STRETCHING DEVICE.

SPECIFICATION forming part of Letters Patent No. 785,511, dated March 21, 1905.

Application filed December 20, 1904. Serial No. 237,643.

*To all whom it may concern:*

Be it known that I, WILLIAM DEWITT MILLER, a citizen of the United States, and a resident of Saco, in the county of Valley and State of Montana, have invented a new and Improved Wire-Stretching Device, of which the following is a full, clear, and exact description.

The object of this invention is to provide novel details of construction for a wire-stretcher that are simple, practical, and inexpensive and that afford means for conveniently stretching and temporarily holding a fence-wire alongside of a post for its convenient attachment thereon.

The invention consists in the novel construction, combination, and arrangement of parts, as is hereinafter described, and defined in the appended claims.

Reference is to be had to the accompanying drawings, forming a part of this specification, in which similar characters of reference indicate corresponding parts in all the figures.

Figure 1 is a perspective view showing the device applied for stretching and holding a fence-wire alongside of a fence-post to permit the wire to be secured on the post. Fig. 2 is an enlarged partly-sectional side view of a sheave-block and latch-dog thereon that is a detail of the invention. Fig. 3 is a transverse sectional view taken substantially on the line 3 3 in Fig. 2, seen in the direction of the arrow. Fig. 4 is an enlarged transverse sectional view substantially on the line 4 4 in Fig. 1. Fig. 5 is an enlarged perspective view of a wire-clamp employed, shown applied opposite the arrow $x$ in Fig. 1; and Fig. 6 is a transverse sectional view substantially on the line 6 6 in Fig. 5.

A spar 10, either of wood or tubular iron, is a leading detail of the improvement and, as shown in Fig. 1, may be tapered somewhat from one end to the other. Upon one end of the spar 10 is mounted and secured a pulley-bracket frame 11, so as to project therefrom, and in this frame is pivoted a grooved sheave-wheel 12. A stretcher-rope 13 of suitable length and thickness is doubled between its ends, and the loop of the doubled rope is mounted upon the grooved pulley or sheave-wheel 12. Upon the end of one run of the doubled rope 13 is secured a bracket-frame 14, wherein is pivoted a grooved pulley 15, and, as is plainly shown in Fig. 2, an angularly-bent dog 16 is pivoted upon the bracket-frame 14, so that a sharp toe on one limb of the dog will be disposed in the path of a rope that is mounted on the pulley 15, said dog being pressed by a spring $a$, so as to enforce such an engagement of the toe of the dog. On a fence-post A, toward which a fence-wire B is to be stretched, is detachably secured the bracket-frame 16, whereon is pivoted a grooved pulley 17. The remaining run of the stretcher-rope 13 is extended through a ring-eye $b'$ on the side of the spar 10 toward the pivoted pulley 17 and is passed around the grooved periphery of said pulley, thence running toward and engaging the pulley 15, and thence extended toward the post A and may pass through a ring-eye $b$ on the side of the spar 10 near its remaining end that is adjacent to the post.

Upon the outer end of the bracket-frame 11 an ear $11^a$ is formed, that is perforated and in said perforation $c$ is loosely held a clamping-bar $11^b$, a hook $c'$ on the lower end of said clamping-bar projecting below the ear, while the upper portion thereof extends above the ear, terminating in a head $11^c$. Between the head $11^c$ and the ear $11^a$ of the bracket-frame 11 a coiled spring $11^d$ is located on the clamping-bar $11^b$, the expansion of the spring pulling upon the hook end of the bar. Upon the side of the spar 10 near the end that in service is adjacent to the post A a wire-holding clamp is mounted, this clamp, as is clearly shown in Figs. 5 and 6, consisting of a flattened boss $d$, whereon is loosely held a clamping-head $d'$, from which projects a short handle $d^2$. The clamping-head $d'$ is connected with the boss $d$ by a screw $d^3$, that projects centrally therethrough and screws into a central tapped hole in the clamping-head, so that the latter may by turning it upon the screw be drawn toward the flat face of the boss $d$ or be retracted therefrom.

In service the fence-wire B is passed into the hook $c'$ on the lower end of the clamping-bar 11^b and is slidably held thereby, the remaining end portion of the fence-wire being releasably secured in the clamp on the spar. Draft force is now applied upon the free end portion of the stretcher-rope 13, which will forcibly pull endwise upon the spar 10, moving the end of said spar having the sheave-wheel 12 and its supporting bracket-frame 11, mounted thereon, toward the fence-post A. This longitudinal movement of the spar stretches the fence-wire B taut and carries the clamped end of the wire far enough beyond the post to permit it to be secured thereon with a staple, as usual. It will be seen that in pulling upon the stretcher-rope 13 the dog 16 will bite upon the rope if the pull is relaxed, and thus hold the rope and wire stretched taut, the dog permitting a free pull upon the end of the rope that passes through the ring-eye on the spar.

While I have shown and described one means for removably supporting a fence-wire at one end of a spar and a means for releasably clamping the wire upon the other end of said spar, it is to be understood that different means for such purposes may be employed, if preferred.

It will be seen that the improved wire-stretching device may be employed for taking up slack in fence-wires that are already erected or be used to stretch wires for the erection of a new fence and be very convenient as well as reliable in service.

Having thus described my invention, I claim as new and desire to secure by Letters Patent—

1. A wire-stretcher comprising three bracket-frames, a pulley held to rotate on each bracket-frame, a spar on one end of which is mounted one of said bracket-frames, and a rope engaging the pulley on each bracket-frame, one end of the rope being secured upon one bracket-frame.

2. A wire-stretcher, comprising three bracket-frames, a pulley held to rotate on each bracket-frame, a spar on one end of which is mounted one of the bracket-frames, a clamping device on the other end of the spar, and a rope engaging the pulleys on the bracket-frames, one end of said rope being secured upon an end of one bracket-frame.

3. A wire-stretcher comprising three bracket-frames, each frame supporting a grooved pulley pivoted thereon, an ear on one bracket-frame carrying a support for the wire to be stretched, a spar on one end of which the bracket-frame having the ear is mounted, a clamping device on the other end of the spar, and a rope engaging the pulleys on the bracket-frames, said rope being secured by one end upon an end of one bracket-frame.

4. A fence-wire stretcher comprising a spar, a pulley held to rotate on one end of the spar, a pulley held to rotate on a fence-post, a stretcher-rope, a pulley held to rotate on one end of the rope, the main portion of said rope passing first around the pulley on the end of the spar, thence passing around the pulley on the post and thence to and around the pulley on the end of the rope, and means for connecting the end of a wire to be stretched with the opposite end of the spar.

5. A fence-wire stretcher comprising a spar, a bracket-frame carrying a pulley and mounted upon one end of the spar, a wire-supporting hook-bar carried at the end of said bracket-frame, a bracket-supported pulley mounted upon a fence-post, a stretcher-rope, a bracket-frame supporting a pulley and secured on one end of the rope, a spring-pressed dog mounted on said bracket-frame for engaging the rope, the main portion of said rope passing first around the pulley on the spar, thence passing around the pulley on the post, and thence to and around the pulley on the end of the rope, and a clamping device on the opposite end of the spar for engaging the wire to be stretched.

In testimony whereof I have signed my name to this specification in the presence of two subscribing witnesses.

WILLIAM DEWITT MILLER.

Witnesses:
  HARRY A. VAGG,
  FRED. W. KRAEGER.